United States Patent Office 3,036,092
Patented May 22, 1962

3,036,092
PRODUCTION OF SUBSTITUTED HALOGENATED PHTHALANS
Donald D. Phillips and Samuel B. Soloway, Modesto, Calif., assignors to Shell Oil Company, New York, N.Y., a corporation of Delaware
No Drawing. Filed June 20, 1960, Ser. No. 37,028
6 Claims. (Cl. 260—346.2)

This invention relates to and has as its object the production of 1,3-disubstituted-4,5,6,7,8,8-hexahalo-3a,4,7,7a-tetrahydro-47-methanophthalans. More particularly, it relates to an improved method for preparing phthalans of the foregoing type, wherein the substituents in the 1 and 3 positions are alkoxy radicals.

The 1,3-dialkoxy-4,5,6,7,8,8 - hexahalo-3a,4,7,7a-tetrahydro-4,7-methanophthalans prepared by the process of this invention are highly effective insecticides, fungicides, acaricides, and can also be used as intermediate products for further organic synthesis. This utility of these compounds and one particular method for their preparation is taught by U.S. 2,879,275, patented March 24, 1959. The starting material used in the process of that patent is 1,3,4,5,6,7,10,10-octachloro-4,7-endomethylene - 4,7,8,9-tetrahydrophthalan. Unfortunately, this starting material is the product of another rather involved and costly synthesis. Moreover, it has been discovered that this very octachlorophthalan may be readily produced by chlorinating the hexachloro products of the process of this invention. Another route for the preparation of 1,3-dialkoxy-hexachlorophthalan was therefore obviously required if the octachloro compound is the desired end product.

An alternate process for the preparation of 1,3-dialkoxy-4,5,6,7,8,8-hexahalo-3a,4,7,7a - tetrahydro - 4,7,- methanophthalans has now been found that offers good yields of the desired product and employs easily obtainable starting materials. The process comprises condensing a hexahalocyclopentadiene with 2,5-dialkoxy-2,5-dihydrofuran.

The hexahalocyclopentadiene starting materials for the process of this invention are preferably those substituted with middle halogens—i.e., bromine or chlorine atoms. Most preferred is hexachlorocyclopentadiene. The starting 2,5-dialkoxy-2,5-dihydrofurans include those having alkoxy groups with straight, branched, and cyclic alkyl groups, each substituent group having up to 18 carbon atoms or more. Typical suitable examples of starting dihydrofurans include among others: 2,5-dimethoxy-2,5-dihydrofuran; 2,5-diethoxy-2,5-dihydrofuran; 2,5-dipropoxy-2,5 - dihydrofuran; 2,5 - diisopropoxy-2,5 - dihydrofuran; 2,5-dibutoxy-2,5-dihydrofuran; 2,5-diisobutoxy-2,5-dihydrofuran; 2,5-dipentyloxy-2,5-dihydrofuran; 2,5-didodecyloxy-2,5-dihydrofuran; 2,5-dioctadecycloxy-2,5-dihydrofuran; 2,5-bis(3-methyl-4 - ethyldecyloxy)-2,5-dihydrofuran; and 2,5-dicyclohexyloxy-2,5-dihydrofuran.

The 2,5-dialkoxy-2,5-dihydrofuran may be prepared readily by reacting furan with chlorine in an alcohol. The particular substituents in the 2,5-positions of the dihydrofuran ring are obtained by appropriate selection of the alcohol, the alkoxy or cycloalkoxy radical bonded to the hydrogen atom of the hydroxyl group in the alcohol being ultimately the substituent in the 2,5-positions of the 2,5-dialkoxy-2,5-dihydrofuran. Therefore it is merely a matter of choosing an alcohol having the desired alkoxy or cycloalkoxy radical in order to prepare the starting substituted dihydrofuran for this invention.

The reactants in the process of this invention may be employed in various ratios and still achieve a high yield of desired equimolar adduct. It has been found, however, that using an excess, e.g., about a two-fold excess, of the dialkoxydihydrofuran over the hexahalocyclopentadiene results in exceptionally high yields in many cases and is therefore preferred. Good yields of equimolar adduct can be obtained, however, with either reactant present in excess, the use of as much as a five-fold excess of either reactant relative to the other being operable.

It is preferred to conduct the reaction in a liquid medium using an inert solvent under the reaction conditions. Suitable inert solvents that may be used are any of the saturated hydrocarbons, such as hexane, cyclohexane, octane, nonane, and the like, and aromatic compounds such as benzene and the alkyl-substituted analogues of benzene such as toluene. It is preferred to use xylene as a solvent since its boiling point is in the range of a convenient reaction temperature.

The process is preferably carried out in liquid medium by heating the starting materials at a temperature and for a time that results in an appreciable amount of product formation. Temperatures in the range from about 50 to about 200° C. generally will result in appreciable product formation. It is found that the range of about 130° C. to about 150° C. readily produces high yields. It is convenient therefore to select a solvent that boils in this latter range so that the reaction may be run for the time necessary while the mixture refluxes.

Subatmospheric and superatomspheric pressures may be used when desired. It is preferred, however, to use atmospheric pressure for convenience.

When the reaction has gone to completion, the reaction products may then be separated and purified by any of the conventional methods. For example, filtration and recrystallization of the product will result in crystals having a suitable degree of purity.

While the foregoing method involving only a hexahalocyclopentadiene and the dialkoxydihydrofuran results in an appreciable amount of product, it has been unexpectedly discovered that the yield of the desired product may be increased by almost three times that obtained by the foregoing method if a minor amount of an oxirane compound is present in the reaction mixture. It has been found that the presence of this type of a compound substantially eliminates interfering side reactions, and thereby promotes the formation of unusually high yields of desired product. In the absence of an oxirane compound, the reaction between the hexahalocyclopetadiene and the 2,5-dialkoxy-2,5-dihydrofuran resulted in the formation of a relatively large quantity of what is believed to be a lactone corresponding to the phthalan that was hoped for, along with a reduced yield of the desired phthalan. When one of the oxirane compounds discussed below was present in the reaction mixture, no lactones were found in the reaction mixture and the yield of desired product was very high.

The present invention accordingly provides an improved process for the preparation of 1,3-dialkoxy-4,5,6,7,8,8-hexahalo-3a,4,7,7a-tetrahydro-4,7-methanophthalans in exceptionally high yields which comprises condensing hexahalocyclopentadiene with 2,5-dialkoxy-2,5-dihydrofuran in the presence of a minor amount of an oxirane compound.

While any organic compound having an epoxy radical (oxirane compound) may be used, it is preferred to use a hydrocarbon compound having at least one vicinal epoxy ring. It is further preferred that the compound be free of any aliphatic unsaturation such as acetylenic or ethylenic linkages that might interfere with the reaction and thereby reduce the yield of the desired product. Preferred compounds would therefore include, among others, alkanes having branched or straight chains, aryl-substituted alkanes, the alkyl portion having branched or straight chains, and alkaryl-substituted alkanes, the alkyl portions having branched or straight chains wherein each of the foregoing alkyl carbon chains has 1, 2 or more epoxy groups. The epoxy group may be substituted in a terminal position, i.e., on the last two carbon atoms if the chain, or on two adjacent internal chain carbon atoms. Most preferred are the aryl-substituted alkanes wherein the alkyl portion of the molecule has one vicinal epoxy group, the alkyl portion of the molecule preferably having no more than 20 carbon atoms.

Examples of preferred compounds include styrene oxide; 1,2-epoxy-3-phenylpropane; 1,2-epoxy-4-phenylbutane; 2,3-epoxy-4 - phenylbutane; 1,2,3,4-diepoxy-5-phenylpentane; 2,3-epoxy-8-phenyldecane; 1,2-epoxy-3,4-dimethyl-12 - phenyldodecane; 1,2-epoxy-20 - phenyleicosane; propylene oxide; butadiene oxide; 1,2-epoxyoctane; 1,2,3,4-diepoxyhexane; and the like.

The epoxide used is present in a minor amount of the reaction mixture. The precise quantity may be varied to suit the particular starting materials employed. It is preferred that the epoxide be used in an amount between about 1% and about 25% by weight of the starting dialkoxydihydrofuran. Amounts ranging between about 5% and about 15% have been found to work well in a great many cases.

The effect of the epoxide compound in the reaction mixture is particularly surprising in view of the fact that when other basic materials such as calcium carbonate are employed, the yield of desired product was not found to be increased over that produced without special additives to the reaction mixture.

Details of the process are best illustrated by reference to the following examples. It is to be understood that these examples are offered for illustrative purposes only and are not to be construed as limiting the invention in any way.

*Example I*

A solution containing 21 grams (0.16 mole) of 2,5-dimethoxy-2,5-dihydrofuran ($n_D^{25}$ 1.4330), 24 grams (0.09 mole) of hexachlorocyclopentadiene, 1.5 grams of styrene oxide, and 42 ml. of xylene was heated under reflux for seven hours. Colorless crystals deposited on standing overnight and were removed by filtration to afford 16 grams of a first crop, M.P. 168–170° C. The filtrate was cooled to 0° C. overnight and a second crop, 2 grams, M.P. 166–169° C., was obtained. Result was 18 grams of 1,3-dimethoxy-4,5,6,7,8,8-hexachloro - 3a,4,7,7a-tetrahydro-4,7-methanophthalan.

The xylene was removed from the filtrate by distillation at 25 mm. Hg, followed by fractionation at 1 mm. to remove 6.5 grams of unreacted 2,5-dimethoxy-2,5-dihydrofuran, B.P. 30–32° C. The pressure then was lowered to 0.07 mm. and the distillation continued to afford 9 grams of unreacted hexachlorocyclopentadiene, B.P. 55–60° C.

The yield of the dimethoxymethanophthalan was calculated to be 90% based on the quantity of hexachlorocyclopentadiene reacted.

*Example II*

A mixture containing 148 grams (0.54 mole) of hexachlorocyclopentadiene, 68 grams (0.52 mole) of 2,5-dimethoxy-2,5-dihydrofuran ($n_D^{25}$ 1.4360), 5 mg. of di-tert-butylhydroquinone, and 110 ml. of xylene was heated under reflux for 12 hours. The xylene was removed by distillation at 25 mm. and the residue was filtered to afford 66 grams of 1,3-dimethoxy-4,5,6,7,8,8-hexachloro-3a,4,7,7a-tetrahydro-4,7-methanophthalan as tan plates, M.P. 162–165° C. The yield based on reacted hexachlorocyclopentadiene is calculated to be 37%.

When the ratio of the dihydrofuran to hexachlorocyclopentadiene was increased to almost a 2-fold ratio, no increase of the percent yield of product was achieved.

*Example III*

In a series of reactions under conditions substantially similar to those of Examples I and II, in which the ratio of dihydrofuran to hexachlorocyclopentadiene was varied from about 1:1 to about 2:1, and in which a minor amount of calcium carbonate was added, the average yield of desired methoxy-substituted product was only about 30%.

We claim as our invention:

1. A process for the preparation of 1,3-dialkoxy-4,5,6,7,8,8 - hexahalo - 3a,4,7,7a - tetrahydro - 4,7, - methanophthalan, wherein each alkoxy group has from 1 to 18 carbon atoms, which comprises condensing hexahalocyclopentadiene with 2,5-dialkoxy - 2,5 - dihydrofuran, wherein each alkoxy group has from 1 to 18 carbon atoms, in the presence of from about 1% w. to about 25% w., based on the dihydrofuran, of a vicinal epoxy hydrocarbon compound, wherein the sole unsaturated carbon-to-carbon linkages are aromatic, said compound having up to 20 carbon atoms and selected from the group consisting of vicinal-epoxyalkane and phenyl-substituted vicinal-epoxyalkane.

2. The process of claim 1, wherein the hexahalocyclopentadiene is hexachlorocyclopentadiene.

3. The process of claim 1, wherein the vicinal epoxy compound is vicinal-epoxyalkane.

4. The process of claim 1, wherein the vicinal epoxy compound is styrene oxide.

5. A process for preparing 1,3-dimethoxy-4,5,6,7,8,8-hexachloro-3a,4,7,7a - tetrahydro-4,7 - methanophthalan, comprising condensing hexachlorocyclopentadiene with 2,5-dimethoxy-2,5-dihydrofuran in the presence of from about 1% w. to about 25% w., based on the dihydrofuran of styrene oxide.

6. The process of claim 1, wherein the vicinal epoxy compound is phenyl vicinal-epoxyalkane.

References Cited in the file of this patent

UNITED STATES PATENTS 2,931,816     Boehme _____ Apr. 5, 1960

FOREIGN PATENTS 772,212     Great Britain _____ Apr. 10, 1957